J. H. ROBERTS.
FRICTION CLUTCH.
APPLICATION FILED JULY 18, 1921.
1,433,656.
Patented Oct. 31, 1922.
3 SHEETS—SHEET 2.
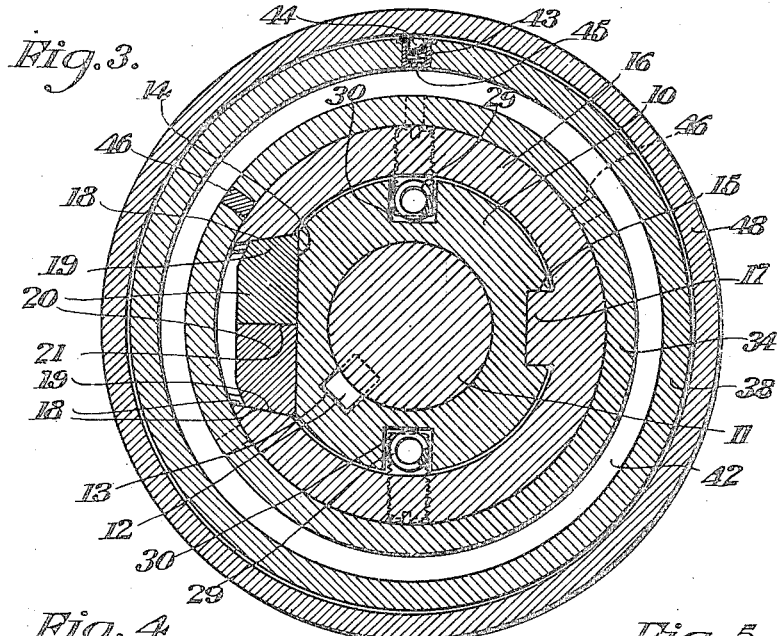
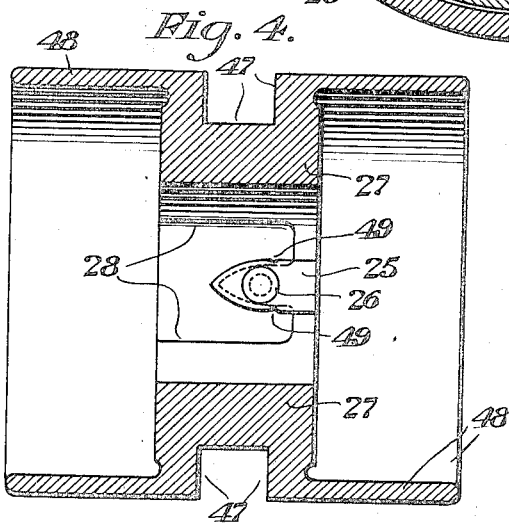
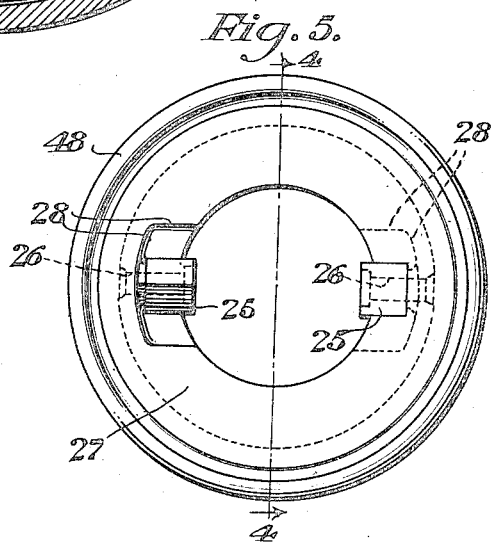
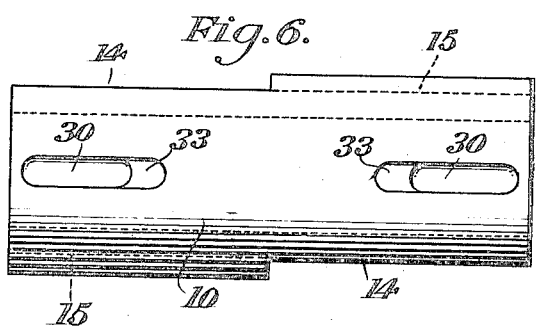
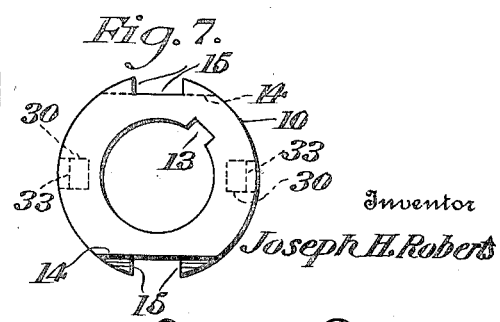
Inventor
Joseph H. Roberts
By
his Attorneys J. H. ROBERTS.
FRICTION CLUTCH.
APPLICATION FILED JULY 18, 1921.
1,433,656.
Patented Oct. 31, 1922.
3 SHEETS—SHEET 3.
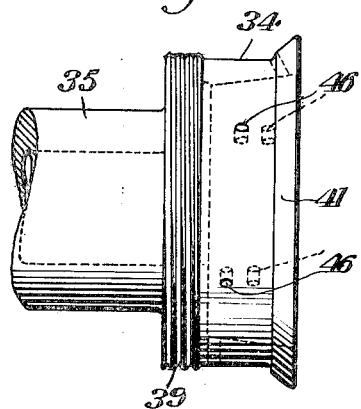
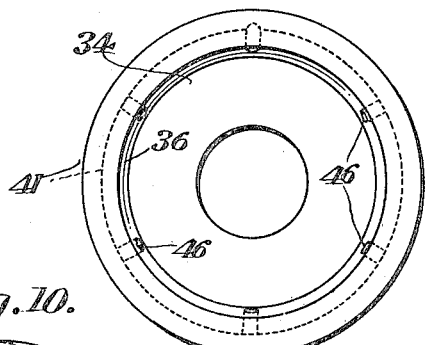
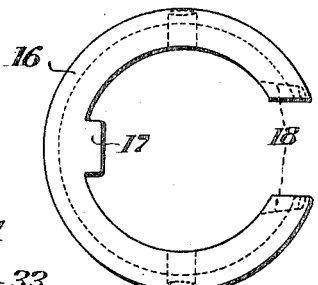
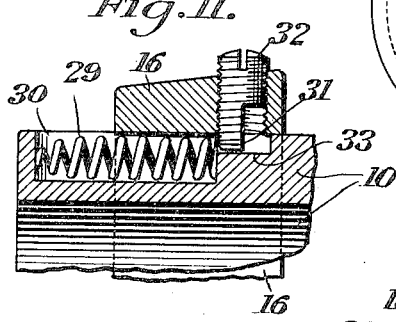
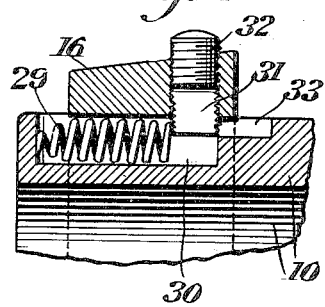
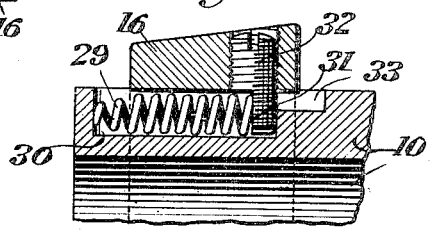
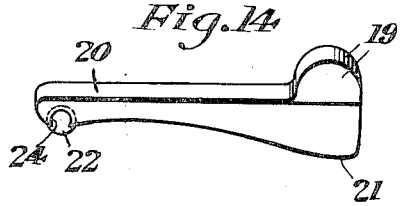
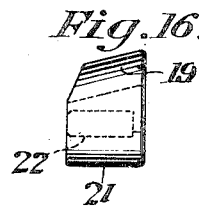
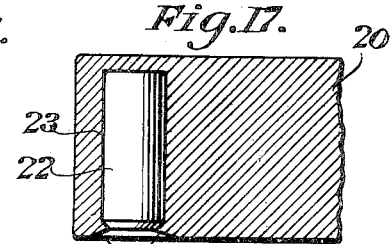
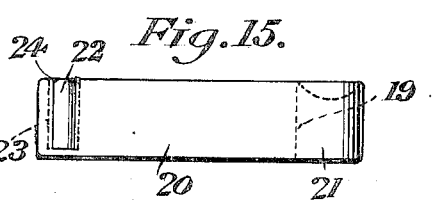
Inventor
Joseph H. Roberts
By
his attorneys.

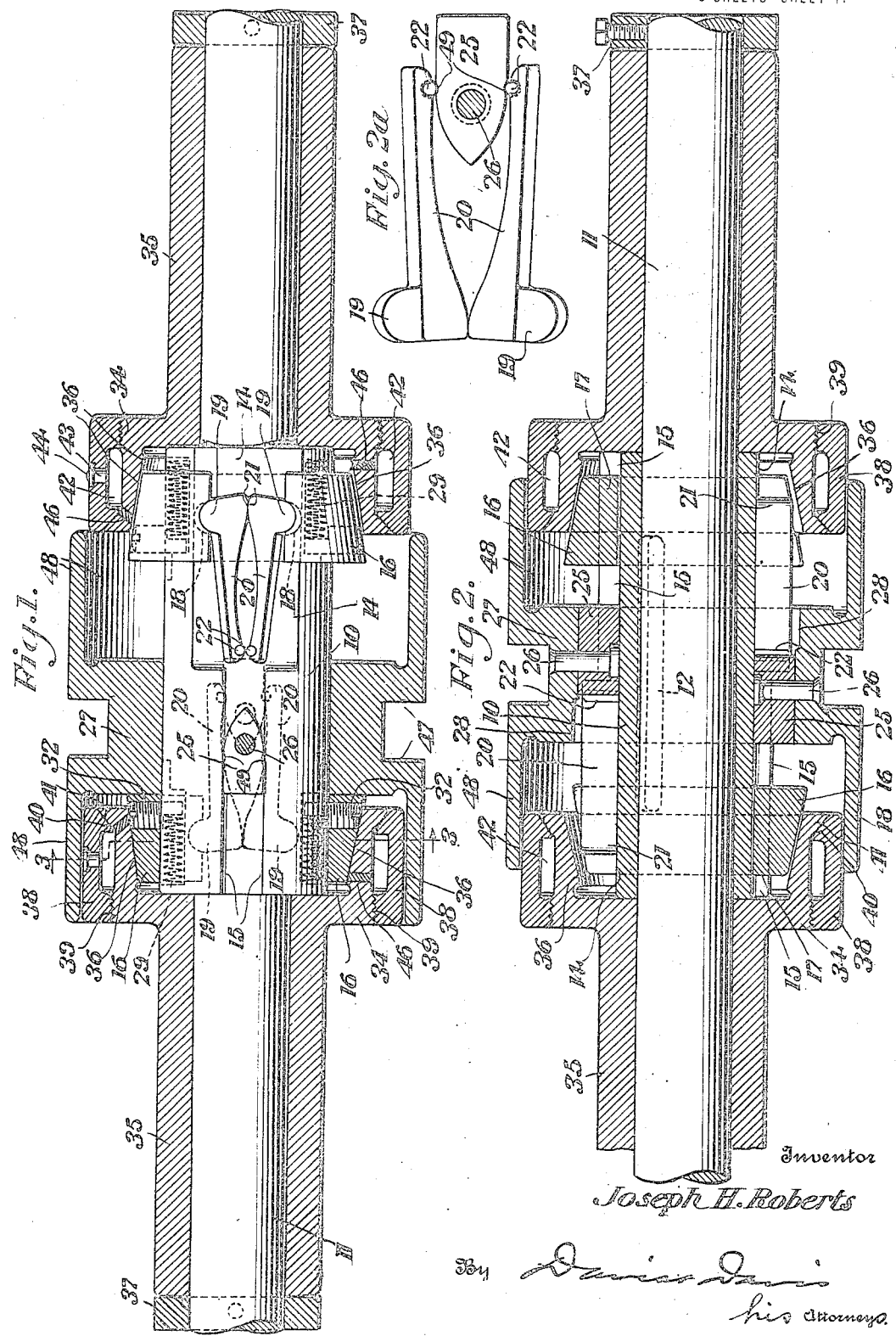

Patented Oct. 31, 1922.

1,433,656

UNITED STATES PATENT OFFICE.

JOSEPH H. ROBERTS, OF MANCHESTER, CONNECTICUT.

FRICTION CLUTCH.

Application filed July 18, 1921. Serial No. 485,525.

*To all whom it may concern:*

Be it known that I, JOSEPH H. ROBERTS, a citizen of the United States, and resident of Manchester, county of Hartford, and State of Connecticut, have invented certain new and useful Improvements in Friction Clutches, of which the following is a specification.

This invention relates to improvements in friction clutches, and has for its principal objects to provide a simple and highly efficient clutch which may be easily and economically manufactured. To these and other ends, which will hereinafter appear, the invention consists in the features of construction, arrangements of parts, and combinations of devices set forth in the following description and particularly pointed out in the claims.

In the drawings, in which the invention is shown embodied in a double clutch.

Figures 1 and 2 are longitudinal sectional views of the clutch, taken in planes at right angles to each other, the clutch elements at the left being shown in driving relation in Fig. 1, and the parts being shown in neutral position in Fig. 2;

Fig. 2ª a detail view showing the friction ring expanding levers spread apart;

Fig. 3 a transverse section on the line 3—3 of Fig. 1;

Fig. 4 a section on the line 4—4 of Fig. 5;

Fig. 5 an end view of the shifter sleeve;

Fig. 6 a side elevation of the clutch body;

Fig. 7 an end view of the clutch body;

Fig. 8 a side elevation of one of the friction cups with the outer wall of the oil chamber removed;

Fig. 9 an end view of the part shown in Fig. 8;

Fig. 10 an end view of one of the split friction rings;

Figs. 11, 12 and 13 detail sectional views showing the manner of assembling the friction rings and the return springs therefor on the clutch body;

Figs. 14, 15 and 16 are a plan, side elevation, and an end view, respectively, of one of the expanding levers for the friction rings; and Fig. 17 a detail sectional view showing the mounting of the antifriction roller in the end of the expanding lever.

The clutch body 10 is of general cylindrical sleeve-like form and is held to the drive shaft 11 by a key 12 seated in a channel in the shaft and engaging in a keyway 13 which extends from end to end of the body. The outer surface of the clutch body 10 is cut away at opposite sides thereof for one half its length from opposite ends of the body to form flat faces 14. A channel 15 extends from the inner end of each flat face 14 to the opposite end of the body, the bottoms of channels 15 being in the same plane as the adjacent flat faces 14. A pair of frustoconical split rings 16 are slidably mounted on opposite ends of the clutch body, each of said rings being formed with an integral key 17 slidably engaging in one of the channels 15, so that said rings rotate with the shaft 11 and clutch body 10 and are each arranged with their divided ends adjacent a different one of the flat faces 14 on the clutch body.

The outer friction surfaces of rings 16 taper toward the outer edges of said rings, and the ends of each ring are provided with oppositely disposed undercut sockets or recesses 18 in which are seated the rounded and tapered side edges of short arms 19 on a pair of ring-expanding and shifting levers 20 which rest upon the adjacent flat face 14 of the clutch body. Each pair of levers 20 are provided at their outer ends with slightly rounded abutting cam portions 21 forming the fulcrums of the levers and are provided at the inner sides thereof, adjacent the inner ends of the power arms of the levers, with antifriction rollers 22. Each roller 22 is rotatably held in an undercut bearing socket 23 closed at one end and having its open end hammered or "peened" in at 24, after the roller is inserted endwise in the socket, to maintain the roller in place.

Each pair of levers 20 is engaged by one of a pair of oppositely disposed shoes or wedge blocks 25, slidably mounted in channels 15 in the clutch body 10, and secured by pins or rivets 26 to the shifter sleeve 27 in slightly staggered relation and with their pointed ends facing in opposite directions so as to pass between the inner ends of the levers when the shifter sleeve is moved longitudinally in opposite directions on the clutch body. Shifter sleeve 27 slides on the clutch body and is held to rotate therewith by reason of the engagement of shoes 25 in channels 15. The inner surface of the shifter sleeve is cut away at oppositely disposed points from opposite ends of the sleeve to points near the wide ends of shoes 25 to provide clearances for the inner ends of levers 20, as shown at 28.

The friction rings or shiftable and expansible clutch elements 16 are normally shifted inwardly toward each other by means of springs 29, two of which act on each ring, said springs being confined in channels or pockets 30 formed in the clutch body 10 adjacent the ends of said body. Springs 29 bear at one end against the outer ends of channels 30 and engage against flat faces 31 of thrust screws 32 at their other ends. In assembling the parts spring 29 is placed in channel 30 and ring 16 is slid partly over the channel. Screw 32 is threaded through an aperture in the ring until its inner end engages in a shallow extension 33 of channel 30 and abuts against the inner end of spring 29, as shown in Fig. 11. Then ring 16 is shifted outward until screw 32 clears extension 33, as shown in Fig. 12, whereupon the screw is threaded farther inward until its head is below the friction surface of the ring and its inner end is engaged in the channel 30 with the flat face 31 abutting against spring 29, as shown in Fig. 13. The spring is thus confined under compression in the channel and also serves to hold screw 32 against accidentally turning. The inward movement of rings 16 is limited by the engagement of screws 32 with the inner ends of channels 30. Levers 20 partake of the longitudinal movement of the rings 16 and are also rockable to expand the rings.

A pair of driven clutch elements or friction cups 34 are loosely mounted on the shaft 11 at opposite ends of the clutch body 10, said cups having integral pulley-receiving hubs 35 at their outer ends and conical recesses in their inner ends, the friction surfaces 36 of said cups surrounding the end portions of the clutch body and partly overhanging the friction surfaces of rings 16, being out of contact with the rings when the shifter sleeve is in neutral position, as shown in Fig. 2. The inner ends of cups 34 abut against the ends of the clutch body and collars 37, held to shaft 11, prevent movement of the cups away from the clutch body. A ring 38, having a circumferential channel therein, is screwed on the exterior of each friction cup at 39, said ring and cup having abutting beveled annular flanges 40 and 41, respectively, at their inner edges, whereby an oil chamber 42 is formed in each driven clutch member. A non-return oil-inlet valve is provided in ring 38, said valve including a valve casing 43, a ball valve 44, and a valve-seating spring 45, as more clearly shown in Fig. 3. In order to maintain a thin film of oil on the friction surfaces of the rings 16 and cups 34, a plurality of porous wooden plugs 46 are driven into apertures through the cups 34, said apertures leading from oil chamber 42 to the friction surface of the cup 34. Oil will seep gradually through plugs 46 and maintain a thin film of oil on the friction surfaces of rings 16 and cups 34.

The shifter sleeve 27 is provided midway its ends with the usual circumferential groove or channel 47 for receiving the fork of the usual clutch shipper, and is also provided at its ends with annular extensions or dust guards 48 overhanging the space between the friction cups in all positions of the clutch.

When the shifter sleeve is in neutral position, as shown in Fig. 2, the tips of the wedge shaped shoes are just ready to pass into the bight of the rollers 22 on levers 20 so that movement of the shifter sleeve in either direction will clutch one friction cup to the shaft, leaving the other cup free. During the initial movement of the shifter sleeve, the shoe 25 which has its pointed end facing in the direction of movement of the sleeve will press against the abutting inner ends of the adjacent pair of levers 20 and shift said levers and the connected ring 16 bodily longitudinally of the clutch body against the pressure of springs 29 until the friction surface of the ring abuts against the friction surface 36 of its cooperating friction cup 34. Further movement of the shifter sleeve will force the shoe between the inner ends of the levers, the rollers 22 rolling upon the beveled side edges of the shoe and finally snapping in notches 49 in the opposite sides of the shoe, thus locking the levers in outwardly rocked or expanded position and holding ring 16 in engagement with cup 34. The rocking of the levers on their abutting fulcrum portions 21 causes a slight expansion of the split ring 16, the outer ends of arms 19 moving slightly outward, transversely of the clutch body, with a toggle-like action. The levers are so shaped as to exert a powerful expanding force on the friction ring so as to prevent slipping of the engaged ring and cup. The inherent resilience of the split ring tends normally to swing the inner roller-carrying ends of the levers together, and it will be observed from an inspection of Figs. 1 and 2$^a$ that the line of pressure of the ring on arms 19 of the levers is slightly inside the point of engagement of the fulcrum portions 21 of the levers even when the inner ends of the levers are fully spread apart. When the shifter sleeve is returned to neutral position springs 29 move ring 16 and levers 20 inwardly away from cup 34 until screws 32 strike the inner ends of channels 30, and the ring contracts as shoe 25 is withdrawn from between the levers and rocks the inner ends of the levers toward each other to normal position.

The lubrication of the friction surfaces prevents roughing up of these surfaces. The longitudinal and expanding movements of the friction rings insures a powerful gripping action, and also insures complete disengagement of the cups and rings when the clutch is in neutral position, thus preventing accidental "picking up" of the cups due to wear in cup bearings. The springs 29 hold the rings positively out of contact with the cups when the shifter sleeve is in its central or neutral position.

It will be observed also that the clutch is so constructed that wear of the friction surfaces of cups 34 and rings 16 will be automatically compensated for.

What I claim is:

1. A friction clutch comprising a driven clutch element having a conoidal internal friction surface, a sleeve-like clutch body adapted to be fixed on a shaft, a conoidal expansible ring divided transversely at one point and mounted on the clutch body to rotate therewith and slide endwise thereon, a shifter sleeve mounted on the clutch body to slide endwise thereon and rotate therewith, and means operable by said shifter sleeve for first forcing said ring endwise against the driven clutch element and then expanding the ring.

2. In a friction clutch, the combination of a drive shaft, a driven clutch element having a conical recess in one end thereof, and means for connecting and disconnecting said element with the drive shaft comprising a sleeve-like clutch body rotatable with the shaft, an expansible split ring having its perimeter tapered toward one edge thereof and adapted to engage the tapered wall of the recess in said element, means connecting said ring with the clutch body to rotate therewith and slide endwise relatively thereto, means for first shifting said ring endwise into engagement with the driven clutch element and then expanding said ring, and resilient means interposed between the ring and the clutch body normally tending to move the ring endwise out of engagement with the driven clutch element.

3. In a friction clutch, the combination of a drive shaft, a driven clutch element having a conical recess in one end thereof, and means for connecting and disconnecting said element with the drive shaft comprising a clutch body rotatable with the shaft, an expansible split ring having its perimeter tapered toward one edge thereof and adapted to engage the tapered wall of the recess in said element, means connecting said ring with the clutch body to rotate therewith and slide endwise relatively thereto, means for first shifting said ring endwise into engagement with the driven clutch element and then expanding said ring, and coil springs confined in channels in the clutch body and engaging abutments on the ring for shifting the ring out of engagement with the driven clutch element.

4. In a friction clutch, the combination of a driven clutch element having an internal conical friction surface, a sleeve-like clutch body adapted to be fixed on a drive shaft, a resilient conoidal ring mounted on the clutch body to slide endwise thereon and and rotate therewith, said ring being divided transversely at one point, a pair of levers extending longitudinally of the clutch body fulcrumed on each other adjacent one end, a wedge held to the clutch body to slide endwise thereof and rotate therewith, and means for shifting said wedge to force the same between the other ends of said levers, said levers having laterally extending arms connected with the ring to shift the ring endwise against the friction surface of the driven element and expand said ring, and said ring normally forcing the ends of the levers engaged by the wedge toward each other.

5. In a friction clutch, the combination of a driven clutch element having an internal conical friction surface, a sleeve-like clutch body adapted to be fixed on a drive shaft, a resilient conoidal ring mounted on the clutch body to slide endwise thereon and rotate therewith, said ring being divided transversely at one point, a pair of levers extending longitudinally of the clutch body fulcrumed on each other adjacent one end, a wedge held to the clutch body to slide endwise thereof and rotate therewith, means for shifting said wedge to force the same between the other ends of said levers, said levers having laterally extending arms connected with the ring to shift the ring endwise against the friction surface of the driven element and expand said ring, and said ring normally forcing the ends of the levers engaged by the wedge toward each other, and spring means interposed between the clutch body and ring for normally shifting the ring endwise away from the driven clutch element.

6. In a friction clutch, the combination of a driven clutch element having an internal conical friction surface, a sleeve-like clutch body adapted to be fixed on a drive shaft, a resilient conoidal ring mounted on the clutch body to slide endwise thereon and rotate therewith, said ring being divided transversely at one point, a pair of levers extending longitudinally of the clutch body fulcrumed on each other adjacent one end, a wedge held to the clutch body to slide endwise thereof and rotate therewith, means for shifting said wedge to force the same between the other ends of said levers, said levers having laterally extending arms connected with the ring to shift the ring endwise against the friction surface of the driven element and expand said ring, and said ring normally forcing the ends of the levers engaged by the wedge toward each other, spring means interposed between the clutch body and ring for normally shifting the ring endwise away from the driven clutch elements, said wedge being provided with recesses at opposite sides thereof, and antifriction rollers carried by the levers adapted to snap into said recesses when the ring has been expanded to lock the ring in its shifted and expanded position.

7. In a friction clutch, the combination of a drive shaft, a sleeve-like clutch body keyed on said shaft, a friction cup loosely mounted on the shaft and having its annular wall surrounding one end of the clutch body, the inner surface of the annular wall of the cup tapering toward the outer end of the cup, an expansible split conoidal ring slidably held to the clutch body to rotate therewith by an integral key, said clutch body having a longitudinal keyway in which the key on the ring engages, a pair of angular levers loosely supported on the clutch body and connected with the ring, a shifter sleeve slidable on the clutch body, a wedge held to the sleeve adapted to shift said levers endwise until the ring engages the cup and then spread the levers to expand the ring, and spring means normally tending to shift the ring out of engagement with the cup.

8. A clutch element comprising a main cup-like body portion provided with an internal friction surface, and an annular outer member threaded at one end on the main body portion, said body portion and outer member being provided with abutting flanges and being spaced apart between said flanges and their threaded connection to form an annular lubricant chamber, the main body portion being provided with passages extending from said chamber to the friction surface.

9. In a clutch, the combination of a sleeve-like body adapted to be mounted on a shaft and having a longitudinal external keyway, a conoidal metal ring slidable on said body divided transversely at one point and formed with an integral inwardly projecting key slidable in said key-way, said body having a longtiudinal channel, a coil spring in said channel, a screw threaded through the ring and projecting into the channel, said screw having a flat side engaging one end of said spring, means for shifting said ring endwise against the pressure of said spring and expanding the ring, and a clutch element having a conical internal friction surface adapted to be engaged by said ring.

In testimony whereof I hereunto affix my signature.

JOSEPH H. ROBERTS.